United States Patent [19]
Ahlvers

[11] 3,732,717

[45] May 15, 1973

[54] APPARATUS FOR THE PRODUCTION OF HELICALLY CORRUGATED METAL TUBING

[75] Inventor: Dieter Ahlvers, Mellendorf, Germany

[73] Assignee: Kabel-und Metallwerke Gutehoffnungshutte, Hannover, Germany

[22] Filed: Oct. 1, 1971

[21] Appl. No.: 185,637

[30] Foreign Application Priority Data

Oct. 7, 1970 Germany.....................P 20 49 235.7

[52] U.S. Cl. ............................................72/77
[51] Int. Cl. .............................................B21b 13/20
[58] Field of Search....................................72/77, 78

[56] References Cited

UNITED STATES PATENTS

| | | |
|---|---|---|
| 3,464,250 | 9/1969 | Stetka ..................................72/77 |
| 2,964,090 | 12/1960 | Raydt et al. ..........................72/77 |
| 3,208,256 | 9/1965 | Lehnert................................72/77 |
| 3,379,042 | 4/1968 | Brown, Sr............................72/77 |

*Primary Examiner*—Richard J. Herbst
*Attorney*—Philip G. Hibert

[57] ABSTRACT

Apparatus for corrugating metal tubing, particularly tubing having a longitudinally welded seam; the apparatus including a driven rotating head of annular form with the metal tubing passing axially through the opening of the head, an annular corrugating die holder being mounted on the head with a corrugating die mounted on the holder; the holder being arranged for axial movement as well as rotary movement whereby to compensate for irregularities in the metal of the tubing or in the welded seam thereof, as well as variations in the hardness of the metal of the tubing, to thereby insure the formation of helical corrugations in the tubing of precise uniformity in dimensions.

6 Claims, 2 Drawing Figures

PATENTED MAY 15 1973　　3,732,717

INVENTOR.
Dieter Ahlvers

BY

ATTORNEY

APPARATUS FOR THE PRODUCTION OF HELICALLY CORRUGATED METAL TUBING

Metal tubing, particularly tubing formed by folding metal tape into tubular form and welding a longitudinal seam therein; has been helically corrugated. The apparatus for corrugating the tubing comprises a driven rotating head in which a corrugating die is mounted so that it can be driven with at least one pitch of the screw thread.

In such known corrugating apparatus the corrugating die is in annular form with the tubing passing through the opening therein, the tubing axis being displaced with respect to the axis of the die; the sum of such displacement and the outer radius of the corrugated tubing being larger then the radius of the die opening. Thus, in such apparatus, the corrugating die rolls itself about the circumference of the tubing to produce a continuous helical corrugation, as typically shown in German Pat. No. 1,086,314.

Such known corrugation apparatus is well suited to high speed operations since frictional heat is mimimal. However, with such apparatus it has been found that small irregularities in the metal tape from which the tubing is formed, as well as in the welded seam, leads to irregularities in the helical corrugations. Further, with variations in the hardness of the metal tape, dimensions such as the spacing of the individual corrugation crests, are not uniform. Since the corrugated tubing is frequently used in forming high frequency electrical cable; uniformity in dimensions is vital to obtain optimum electrical characteristics and irregularities in the corrugations lead to interfering reflections of transmitted waves particularly in frequencies above 50 MHz.

Apparatus for forming helically corrugated tubing is also known in which a corrugating die is screwed into the smooth tubing to produce the corrugations, as typically shown in German Pat. No. 690,138. This type of corrugating apparatus fails to provide the desired uniformity in dimensions in the finished corrugated tubing which is so important when the corrugated tubing is used to form high frequency electrical cables.

It has been found that a contributing factor to the irregularities in corrugation dimensions, is the differing tensions induced in the tubing as the same is being corrugated, by the draw-off means. One such known draw-off means uses moving chuck means which engages and disengages the finished tubing, as shown in U.S. Pat. No. 3,023,300. However, the chuck means induce different tensions at the points of engagement and disengagement thereof with the moving corrugated tubing.

Accordingly, an object of this invention is to provide improved apparatus for helically corrugating tubing which eliminates irregularities in the corrugations and insures uniformity of dimensions of the corrugations.

Another object of this invention is to provide apparatus of the character described which includes a corrugating die arranged for rotation to form helical corrugations in a moving tubing; such die further being arranged for axial movement to adjust the torques transmitted to the corrugating die and thereby compensate for any irregularities in the metal from which the tubing is formed, irregularities in the welded seam or variations in the hardness of the metal.

Other objects of this invention will in part be obvious and in part hereinafter pointed out.

DESCRIPTION OF THE PREFERRED EMBODIMENT

Figure 1:
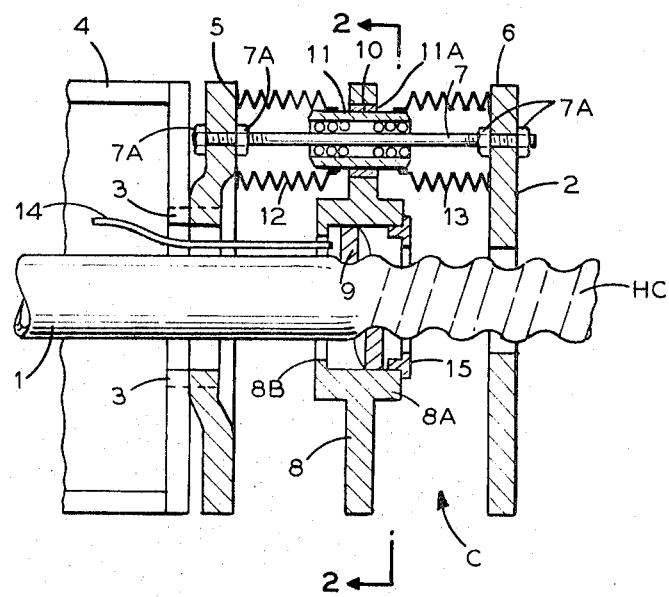
FIG. 1 is a longitudinal sectional view showing apparatus for helically corrugating metal tubing embodying the invention.
Figure 2:
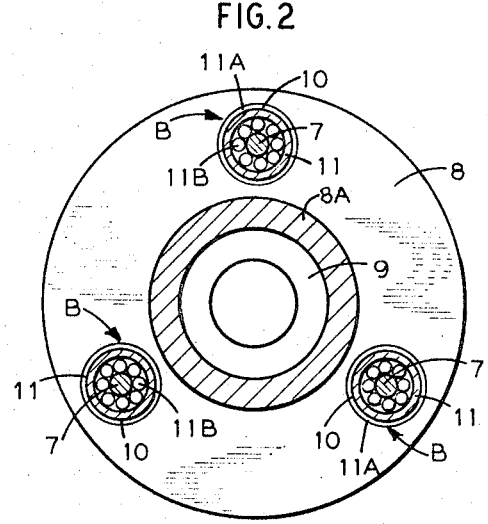
FIG. 2 is a transverse sectional view taken on the line 2—2

The corrugating apparatus of the instant invention comprises essentially a rotatable corrugating head which includes an annular corrugating die holder, a corrugating die mounted on the holder; the holder being rotatable with the head while an axially moving tubing is engaged by the corrugating die to corrugate the same; the holder being further arranged to have axial movement as well as rotatable movement to compensate for excessive torques transmitted to the corrugating die.

Thus, as shown in the drawings, C generally designates a corrugating apparatus embodying the invention. The same comprises a corrugating head generally indicated at 2 which is adapted to helically corrugate the metal tubing 1 which may be formed from a moving metal tape folded to tubular form and having a longitudinally welded seam produced by a fixed electric arc welding means operating in an inert atmosphere. The tubing 1 is brought to corrugating head 2 by suitable draw-off means not shown.

The corrugating head 2 is rotated by suitable drive means generally indicated at 4 which includes gearing etc., not shown. The head 2 comprises a pair of annular disc members 5, 6 in axially spaced relation. The innermost disc member 5 is secured drive means 4 by pins 3.

The disc members 5, 6 are held in spaced relation by axially extending rods 7 which are threaded at their ends passing through angularly spaced openings 5A, 6A in disc members 5, 6. Nuts 7A hold the rods 7 in place.

A corrugating die holder 8 is located between disc members 5, 6 and being mounted on rods 7. Holder 8 includes an annular hub portion 8A having an annular shoulder 8B. A pitch of screw corrugating die 9 is disposed in hub portion 8A, abutting shoulder 8B. An externally threaded flanged ring 15 is screwed into internally threaded hub portion 8A to retain die 9 in place and to allow for removal and replacement of the same as desired.

As head 2 is rotated, die 9 is effective to form the helical corrugations HC in tubing 1, as the tubing passes through the openings in disc members 5, 6 and the opening in holder 8.

Means is provided for compensating for variations in the draw-off speed of the draw-off means, not shown, which would otherwise adversely affect the desired uniformity in spacing of the corruations in the tubing being corrugated. To this end, holder 8 is formed with a plurality of spaced openings 10 located adjacent the circumference thereof, and for the purpose of illustration are shown as 3 in number at 120° intervals.

Bearing means generally indicated at B are mounted in openings 10 for supporting holder 8 on rods 7. Each bearing means B comprises a tubular sleeve 11 fixed in openings 10 by adhesive 11A. Ball bearings 11B are disposed in sleeves 11 and engage the rods 7. It will be apparent that holder 8 is free for longitudinal displacement as the same rotates; such displacement may be up to 20 mm.

It has been found that such longitudinal displacement of the corrugating holder 8 and die 9 therein is automatically responsive to irregularities in the metal or variations in the hardness thereof, as well as variations in tension induced in the tubing 1 by the draw-off means, not shown, As a result, the finished corrugated tubing shows precision uniformity in dimensions of the corrugations including spacing of the crests thereof.

To prevent foreign matter from getting into bearings 11B, pleated sleeves 12, 13 extend between disc members 5, 6 and bearing sleeves 11.

Also, heat generated at the point of corrugation of tubing 1 may be dissipated by cooling fluid brought by conduit 14 and sprayed against die 9.

I claim:

1. Apparatus for helically corrugating metal tubing comprising a rotatable corrugating head, an annular corrugating die holder on said head and arranged for rotation therewith, a corrugating die mounted on said holder, and means for mounting said holder on said head for automatic axial movement of said holder relative to said corrugating head in response to variations in torques transmitted to said corrugating die.

2. Apparatus as in claim 1 wherein said head comprises a pair of disc members and spacer means for holding said disc members in axially spaced relation to each other, said die holder being mounted on said spacer means.

3. Apparatus as in claim 2, wherein said spacer means comprises a plurality of elongated members in angularly spaced relation to each other, the opposite ends of said elongated members being fixed to circumferentially spaced portions of the respective disc members.

4. Apparatus as in claim 3, wherein said holder mounting means comprises ball bearing means, said ball bearing means comprising tubular bearing sleeve and bearings disposed within said sleeve, means for fixing said bearing sleeves to said die holder, said bearings engaging said elongated members.

5. Apparatus as in claim 4, wherein said holder means is formed with angularly spaced openings, the bearing sleeves being disposed in said spaced openings respectively.

6. Apparatus as in claim 1 and further including conduit means arranged to pass a cooling medium to said corrugating die.

* * * * *

Dedication 3,732,717.—*Dieter Ahlvers*, Mellendorf, Germany. APPARATUS FOR THE PRODUCTION OF HELICALLY CORRUGATED METAL TUBING. Patent dated May 15, 1973. Dedication filed July 23, 1974, by the assignee, *Kabel- und Metallwerke Gutehoffnungshutte Aktiengesellschaft.*

Hereby dedicates to the Public the entire remaining term of said patent.

[*Official Gazette November 12, 1974.*]